United States Patent
Ward (10) Patent No.: US 9,797,303 B2
(45) Date of Patent: Oct. 24, 2017

(54) TURBOCHARGER WITH THRUST BEARING PROVIDING COMBINED JOURNAL AND THRUST BEARING FUNCTIONS

(71) Applicant: BorgWarner Inc., Auburn Hills, MI (US)

(72) Inventor: Daniel N. Ward, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 427 days.

(21) Appl. No.: 14/391,108

(22) PCT Filed: Apr. 1, 2013

(86) PCT No.: PCT/US2013/034775
§ 371 (c)(1),
(2) Date: Oct. 7, 2014

(87) PCT Pub. No.: WO2013/154852
PCT Pub. Date: Oct. 17, 2013

(65) Prior Publication Data
US 2015/0322852 A1    Nov. 12, 2015

Related U.S. Application Data

(60) Provisional application No. 61/622,107, filed on Apr. 10, 2012.

(51) Int. Cl.
| | |
|---|---|
| *F04D 29/056* | (2006.01) |
| *F02B 39/14* | (2006.01) |
| *F02B 37/12* | (2006.01) |
| *F02B 39/00* | (2006.01) |
| *F16C 17/10* | (2006.01) |

(Continued)

(52) U.S. Cl.
CPC ............ *F02B 39/14* (2013.01); *F01D 25/166* (2013.01); *F01D 25/186* (2013.01); *F02B 37/12* (2013.01); *F02B 39/00* (2013.01); *F04D 25/024* (2013.01); *F04D 29/0513* (2013.01);
(Continued)

(58) Field of Classification Search
CPC .......... F02B 39/14; F02B 37/12; F02B 39/00; F01D 25/166; F01D 25/186; F04D 25/024; F04D 29/051; F16C 17/10; F16C 2360/24; F05D 2220/40
See application file for complete search history.

(56) References Cited

U.S. PATENT DOCUMENTS

| | | | | |
|---|---|---|---|---|
| 3,434,762 | A * | 3/1969 | Marley ................. | F16C 17/024 384/103 |
| 3,680,932 | A * | 8/1972 | Raimondi ............. | F01D 25/166 384/291 |

(Continued)

*Primary Examiner* — Gregory Anderson
*Assistant Examiner* — Eldon Brockman
(74) *Attorney, Agent, or Firm* — BrooksGroup (57) ABSTRACT

Turbochargers typically have separate hydrodynamic journal and thrust bearings. A turbocharger thrust bearing for a turbocharger is provided that merges the function of a journal bearing into a thrust bearing while maintaining the thrust bearing function to produce a turbocharger with a reduced axial space envelope. Such a thrust bearing includes a bore contoured to have a plurality of taper-land pairs distributed circumferentially about the bore. As a result, the axial length of the turbocharger bearing housing and shaft can be reduced.

15 Claims, 7 Drawing Sheets

(51) Int. Cl.
    *F01D 25/16*         (2006.01)
    *F01D 25/18*         (2006.01)
    *F04D 25/02*         (2006.01)
    *F04D 29/051*       (2006.01)

(52) U.S. Cl.
    CPC .......... *F16C 17/10* (2013.01); *F05D 2220/40* (2013.01); *F16C 2360/24* (2013.01)

(56) References Cited

U.S. PATENT DOCUMENTS

| | | | |
|---|---|---|---|
| 4,348,065 A | | 9/1982 | Yoshioka et al. |
| RE32,764 E | * | 10/1988 | Smith ............... F16C 17/10 384/275 |
| 4,863,291 A | | 9/1989 | Heshmat et al. |
| 5,137,418 A | * | 8/1992 | Sieghartner ......... F04D 5/002 384/113 |
| 5,178,471 A | | 1/1993 | Roessler et al. |
| 6,409,464 B1 | * | 6/2002 | Fisher ............... F01D 25/16 384/475 |
| 6,739,756 B2 | * | 5/2004 | Miller ............... F16C 17/03 384/117 |
| 8,038,350 B2 | * | 10/2011 | Hayakawa ........... F16C 17/10 29/898 |
| 2003/0142890 A1 | * | 7/2003 | Miller ............... F16C 17/03 384/117 |
| 2006/0018578 A1 | | 1/2006 | Krauss et al. |
| 2006/0165325 A1 | | 7/2006 | Link et al. |
| 2008/0037918 A1 | * | 2/2008 | Hayakawa ........... F16C 17/10 384/228 |

* cited by examiner

TURBOCHARGER WITH THRUST BEARING PROVIDING COMBINED JOURNAL AND THRUST BEARING FUNCTIONS

FIELD OF THE INVENTION

Embodiments relate in general to turbochargers and, more particularly, to bearing systems in a turbocharger.

BACKGROUND OF THE INVENTION

Turbochargers are a type of forced induction system. They deliver air, at greater density than would be possible in the normally aspirated configuration, to an engine intake, allowing more fuel to be combusted, thus boosting the engine's horsepower without significantly increasing engine weight. This can enable the use of a smaller turbocharged engine, replacing a normally aspirated engine of a larger physical size, thus reducing the mass and aerodynamic frontal area of the vehicle.

The rotating assembly of a turbocharger rotates at exceptionally high speed in the order of 200,000 RPM for a small rotor and 80,000 RPM for a large rotor. Typically, the rotating assembly of a turbocharger is supported by a class of bearing known as an internally pressurized or hydrodynamic bearing. In this class of bearing, the rotation of the shaft, relative to the bore in which it resides, drags the lubricant in the direction of rotation, causing the generation of a wedge of oil between the relatively low speed element and the relatively high speed element. The squeeze film nature of the system causes an asymmetric force to be exerted on the shaft. The magnitude of the force applied to the bearing by the unbalance is proportional to the shaft speed squared.

Figure 1:
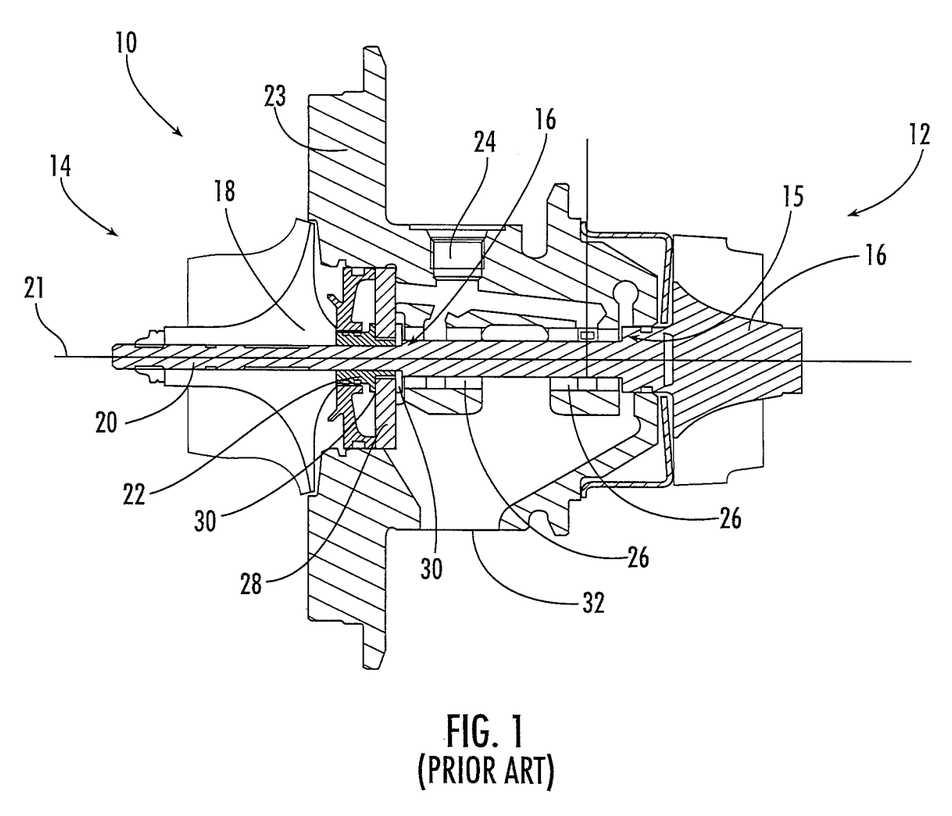
FIG. 1 is a cross-sectional view of a typical floating bearing turbocharger.

FIG. 1 shows a cross-sectional view of a typical floating bearing turbocharger (10). The turbocharger (10) includes a turbine stage (12) and a compressor stage (14). Turbochargers use the exhaust flow from the engine exhaust manifold to drive a turbine wheel (16), which is located in a turbine housing (not shown). Once the exhaust gas has passed through the turbine wheel (16) and the turbine wheel (16) has extracted energy from the exhaust gas, the spent exhaust gas exits the turbine housing through an exducer and is ducted to the vehicle downpipe and usually to after-treatment devices such as catalytic converters, particulate traps, and $NO_x$ traps. The energy extracted by the turbine wheel (16) is translated to a rotational motion, which then drives a compressor wheel (18). The compressor wheel (18) draws air into the turbocharger (10), compresses this air, and delivers it to the intake side of the engine. The rotating assembly consists of the following major components: turbine wheel (16); a shaft (20) upon which the turbine wheel (16) is mounted; a compressor wheel (18) also mounted on the shaft (20); an oil flinger (22); and thrust components. The shaft (20) has an associated axis of rotation (21).

The shaft (20) rotates on a hydrodynamic bearing system which is fed oil, typically supplied by the engine. The bearing system can be provided in a bearing housing (23). The oil is delivered via an oil feed port (24) to feed both journal bearings (26) and thrust bearings (28). The same system is typically used on each of the two journal bearings in a turbocharger. The function of the journal bearing is to control, maintain, and damp the radial oscillations of the rotating assembly. A separate thrust bearing (28) controls and maintains the axial position of the rotating assembly relative to the aerodynamic features in the turbine housing and compressor housing (not shown). The thrust loads are typically carried by ramped hydrodynamic bearings working in conjunction with complementary axially-facing rotating surfaces of a pair of thrust washers (26). In some turbochargers, one thrust washer is part of the oil flinger (22), and the other becomes part of the complementary assembly. In other turbochargers, the thrust washer is a single part with two opposing faces fabricated onto a cylindrical part, in the shape of a bobbin, and the bottom segment of the thrust bearing bore remains open, like a horseshoe, to accept the thrust washer. Once used, the oil drains to the bearing housing (23) and exits through an oil drain (32) fluidly connected to the engine crankcase.

Figure 2:
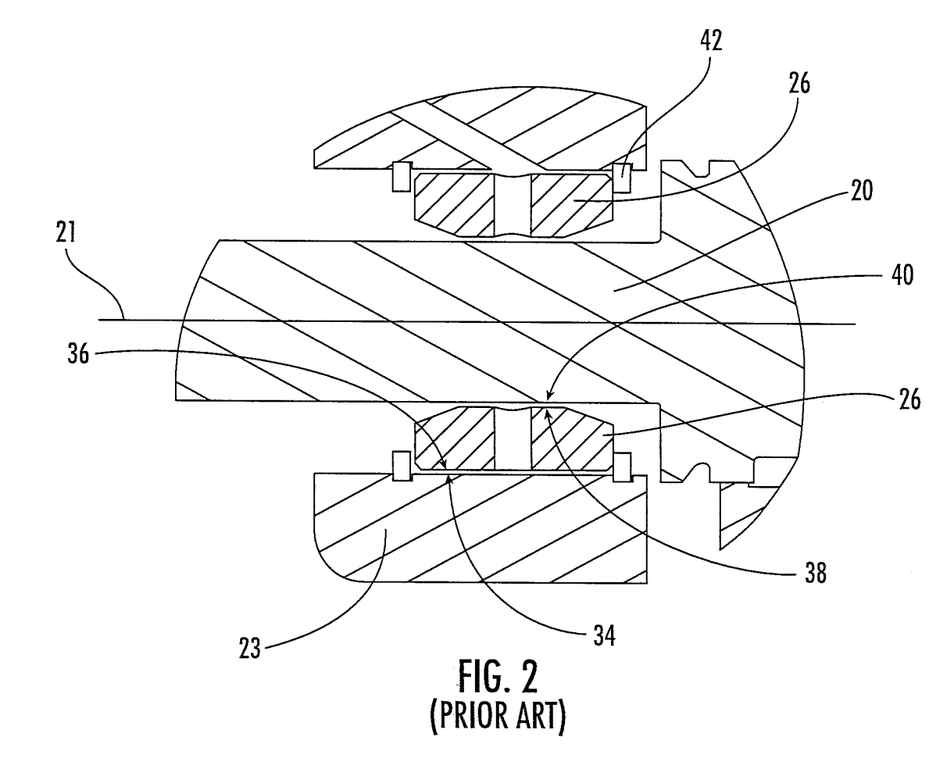
FIG. 2 is close-up view of a typical floating turbocharger bearing.

With a typical floating journal bearing, there are two hydrodynamic films in action. As depicted in FIG. 2, one hydrodynamic film operates between the surface of the static inner bore (34) of the bearing housing (23) and the rotating outer peripheral surface (36) of the journal bearing (26). The other hydrodynamic film operates between the rotating inner peripheral surface (38) of the journal bearing (26) and the faster-moving outer peripheral surface (40) of the shaft (20). While the bearing housing (23) is static (relative to the shaft (20)), the journal bearing (26) rotates at approximately 10% to 30% of the speed of the shaft (20), depending upon the torque balance between the outer oil film torque and the inner oil film torque. The journal bearings (26) are typically held in place by the use of retaining rings (42) which locate in grooves in the bearing housing (23).

A taper-land journal bearing system typically has a "non-rotating bearing", which has only one rotating oil film system, and that is the system between the outside surface of the rotating shaft and the inside surface of the bore in the rotationally static bearing. In this bearing design, there typically still exists a non-rotating oil film between the outside surface of the bearing and the inside surface (23) of the bearing housing. The latter is used as a damping mechanism only, producing no sub-synchronous response. A typical taper land bearing is prevented from rotation while being able to float and be damped by the outer oil film through a non-rotation device. In addition to the ability of the bearing system to withstand unbalance loads, the removal of one of the rotating fluid films (e.g., the fluid film between the outer peripheral surface (36) of the journal bearing (26) and the inner peripheral surface of the bearing housing bore (34)) reduces the path of the sub-synchronous vibration transmittance, which removes the opportunity for the vibration to be transmitted through the bearing housing as an objectionable noise. The inner oil film system of a taper land design uses a pair of axially defined three pocket taper-land features external to the annulus formed by the surface of the basic inside diameter of the non-rotating bearing and the outer peripheral surface (40) of the rotating shaft (20) to artificially create a stabilizing balance load on the rotating shaft of the rotating assembly.

The requirements of the functions of the bearings determine in part the axial length of the turbocharger in that the bearings are placed to minimize the overhung masses of the wheels. The thrust bearing is typically outboard of the compressor-end journal bearing, thus adding more to the axial length of the turbocharger. The axial span of the bearings becomes a critical element in the axial length of the turbocharger and thus a critical element in the fitting of a turbocharger, or more commonly multiple turbochargers, into the engine bay of a vehicle.

Engine compartments of modern vehicles are always compact to reduce the frontal area of the vehicle, and this presents difficulties in the fitting of turbochargers to the various interfaces on the vehicle. With the endeavors of the vehicle manufacturers to improve the aerodynamics of the vehicle, coupled with the drive for better fuel efficiency of the engine, while meeting ever more stringent emissions, the space allocated for the turbocharger is becoming more problematic. With the advent of an ever increasing acceptance of two stage turbochargers, vehicle manufacturers are now trying to fit two turbochargers into the space allocated for a single turbocharger so the size of the turbocharger is becoming more important.

Thus, there is a need for a system for reducing the axial length of a turbocharger.

SUMMARY OF THE INVENTION

Embodiments relate to the design of a turbocharger thrust bearing which incorporates a taper-land configuration in the bore of the thrust bearing. In this way, the functions of a journal bearing and a thrust bearing can be achieved in the trust bearing, eliminating the need for a separate journal bearing. As a result, the axial length of the turbocharger can be reduced.

BRIEF DESCRIPTION OF THE DRAWINGS

The present invention is illustrated by way of example and not limitation in the accompanying drawings in which like reference numbers indicate similar parts, and in which.

DETAILED DESCRIPTION OF THE INVENTION

Arrangements described herein relate to device turbocharger with a thrust bearing configured to provide the compressor-end journal bearing function within the thrust bearing while still supporting the thrust bearing function. Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Arrangements are shown in FIGS. 3-8, but the embodiments are not limited to the illustrated structure or application.

Figure 3:
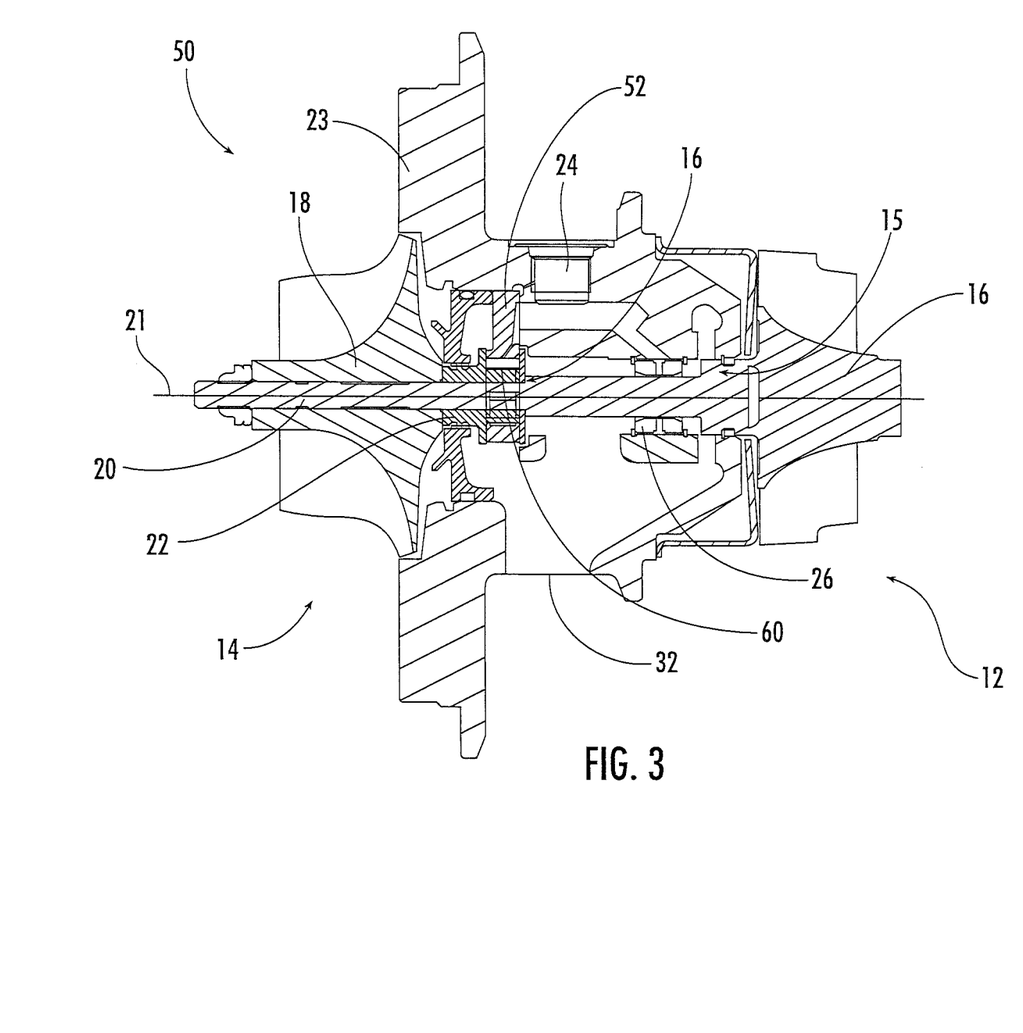
FIG. 3 is a cross-sectional view of a turbocharger with a combined journal and thrust bearing system.

Referring to FIG. 3, a turbocharger (50) having a thrust bearing (52) configured according to embodiments herein is shown. The turbocharger (50) includes a bearing housing (23) in which a shaft (20) is received. The shaft (20) includes a turbine region (51), which is near the turbine stage (12). The shaft (20) also includes a compressor region (53), which is near the compressor stage (14). In such a turbocharger (50), journal bearings (26) are provided to support the turbine region (51) of the shaft (20). However, according to embodiments herein, journal bearings are not provided to support the compressor region (53) of the shaft (20).

FIGS. 4-8 show an example of the thrust bearing (52) configured according to embodiments herein. The thrust bearing (52) can include a main body (55). The thrust bearing (52) can be any suitable type of thrust bearing. For instance, the thrust bearing (52) can be of the type taught in U.S. Pat. No. 7,401,980, which is incorporated herein by reference. However, the thrust bearing (52) can be any turbocharger thrust bearing, such as a thrust bearing which distributes the oil by internal oil galleries.

Figure 4:
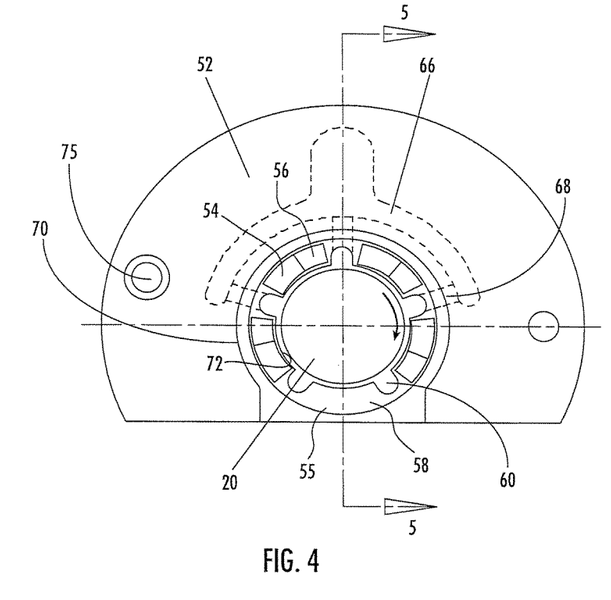
FIG. 4 is a view of a thrust bearing configured to provide a combined journal and thrust bearing system.

As in most types of thrust bearings (including the one taught in U.S. Pat. No. 7,401,980), the thrust bearing (52) can include an array of pairs of ramps (54) and lands (56) provided about an axially facing side (58) thereof. Each ramp-land pair can fit within a predetermined arc length. For instance, the ramp (54) can be contained within arc length ($\xi_R$), and the land can be contained within arc length ($\xi_L$). Oil can be supplied to each ramp (54) via a cross cut through groove (60) (also referred to as a key bed), connecting the two axially facing sides (58, 59) of the thrust bearing (52).

Figure 5:
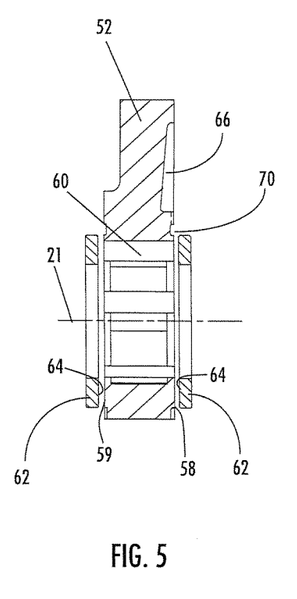
FIG. 5 is a cross-sectional view of the thrust bearing shown in FIG. 4.

A thrust washer (62) can be provided substantially adjacent to each axially facing side (58, 59) of the thrust bearing (52), as is shown in FIG. 5. As in a typical thrust bearing, the thrust washers (62) can impart the loads of the rotating assembly to the bearing housing, via the thrust bearing (52), to set and maintain the axial position of the shaft and the relative position of the compressor and turbine wheels relative to their respective housings. The relative surface velocity of the inward facing rotating surfaces (64) of each of a pair of thrust washers (62) imparts motion to some of the oil and compresses the oil as it passes over the convergent ramp (54). There can be any suitable quantity of grooves (60) provided in the thrust bearing (52). The ramp-land pair can be provided between neighboring grooves (60). These features can provide the load carrying capacity required of the thrust bearing (52). It will be appreciated that the ratio of ramp to land can be modified to achieve the desired load and efficiency. The ramp (54) and land (56) can be formed in the thrust bearing (52) in any suitable manner, such as by coining, machining or other suitable method.

The thrust bearing (52) can include an oil canal (66) and oil transfer galleries (68). The oil canal (66) can be in fluid communication with the oil transfer galleries (68). A peripheral groove (70) can be provided on each of the axially facing surfaces (58, 59) of the thrust bearing (52) to distribute the oil to the lower (i.e. non-directly fed by the oil transfer galleries (68)) ramps (54) and lands (56).

The thrust bearing (52) can include an inner bore (72) which can receive a portion of the shaft (20). The inner bore (72) can have an associated center axis (74). The thrust bearing (52) can have an associated circumferential direction that extends about the center axis (84).

The grooves (60) can open to the bore (72) and be in fluid communication therewith. The grooves (60) and the bore (72) extend axially through the thrust bearing (52). The portions of the bore (72) between the grooves (60) are referred to as pads (74).

Figure 6:
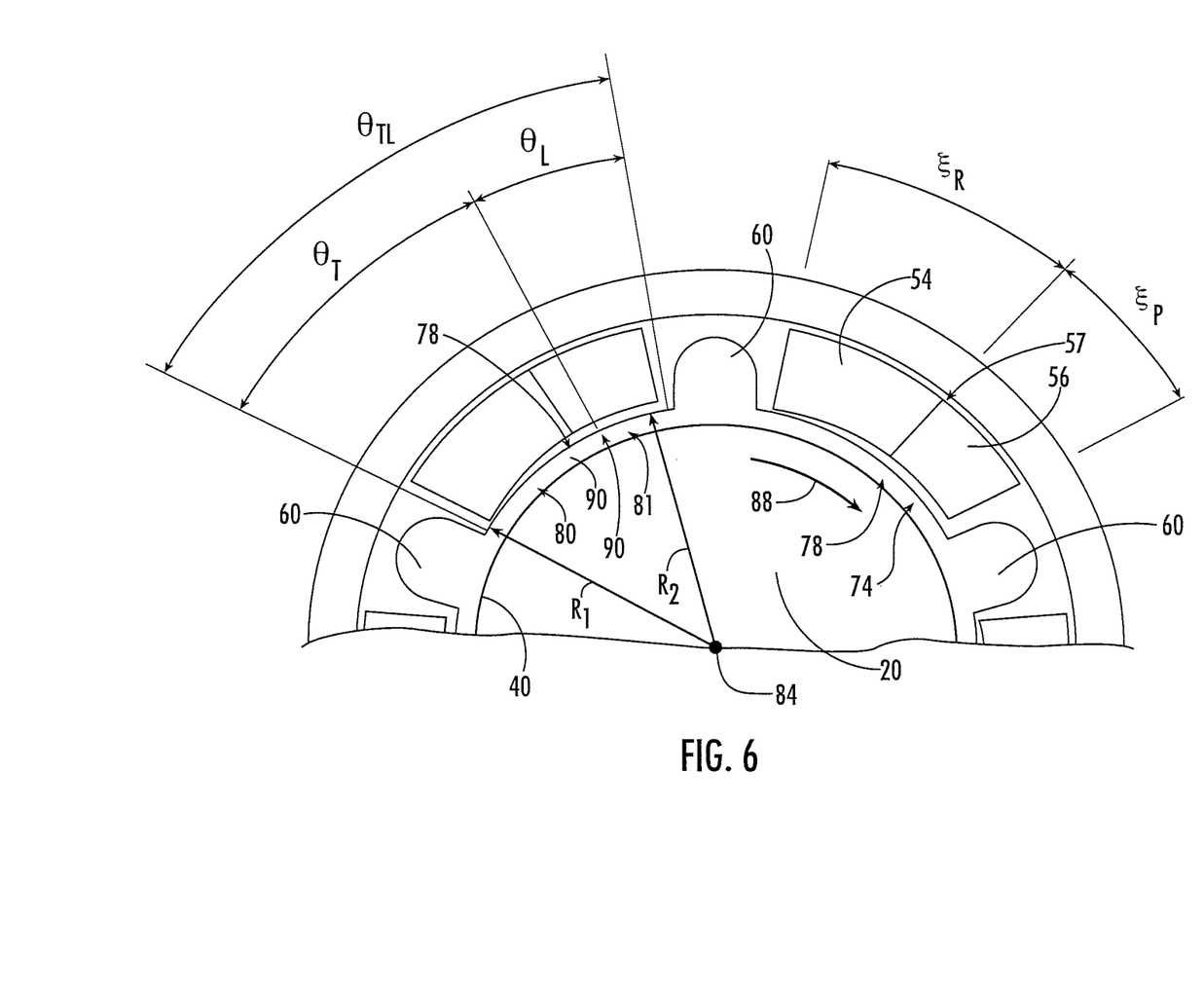
FIG. 6 depicts a close-up view of the thrust bearing.
Figure 7:
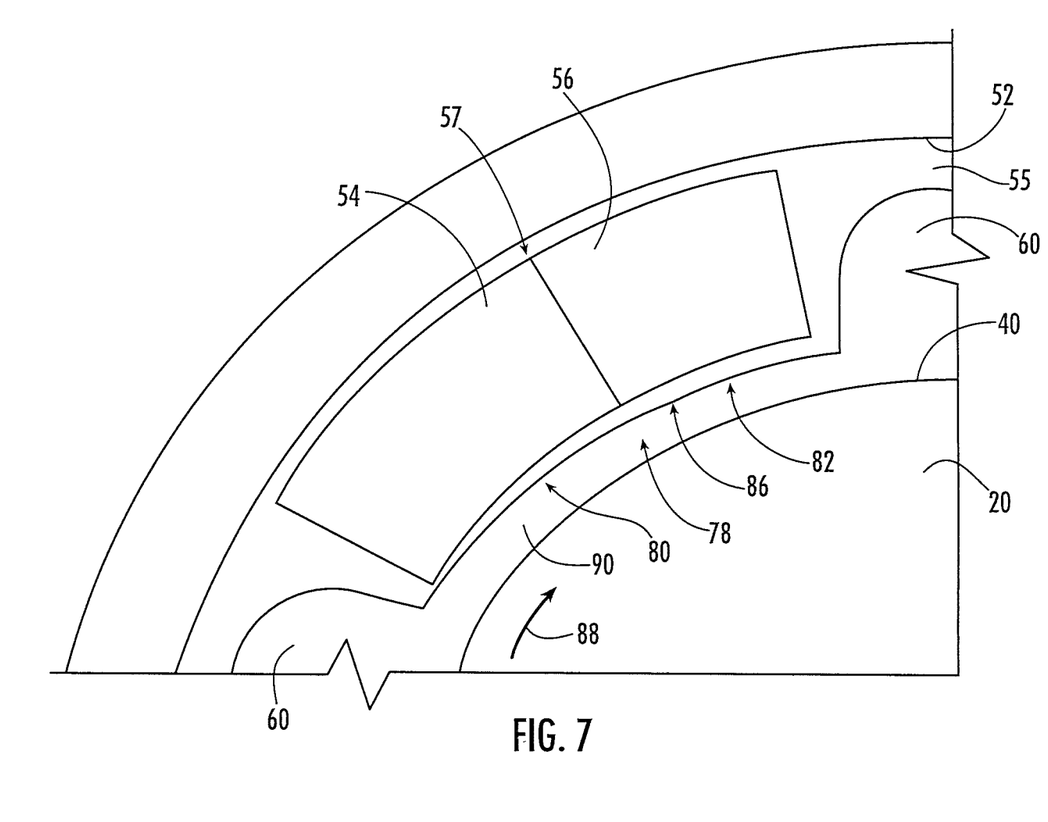
FIG. 7 is a close-up view of a taper-land pair of the thrust bearing.

According to embodiments herein, the bore (72) can be configured to provide the functionalities of a journal bearing. To that end, the bore (72) can be contoured to provide a plurality of taper-land pairs (78). Referring to FIGS. 6 and 7, each taper-land pair (78) can include a taper portion (80)

and a land portion (82). The taper-land pairs (78) can be formed in any suitable manner, such as by any suitable machining process.

The taper portions (80) can have any suitable configuration. The taper portions (80) can be generally arcuate. The taper portion (80) can begin at a first radial distance (R1) from the center axis (84). Moving in the direction of rotation (88), the taper portion (80) can extend generally circumferentially. The radial distance of the taper portion (80) from the center axis (84) can decrease from the beginning of the taper portion (80) to the end of the taper (80) (e.g., at or near a transition (86) between the taper portion (80) and the land portion (82)). The decrease in radial distance can occur substantially continuously along the length of the taper portion (80), or the decrease in radial distance can occur in a non-continuous manner, such as by one or more steps or sudden contour change. The taper portions (80) can be defined by a radius that is offset from the central axis (84).

The taper portion (80) can transition to the land portion (82) at a second radial distance (R2) from the center axis (84). The second radial distance (R2) can be less than the first radial distance (R1). The entire land portion (82) can be at a substantially constant radial distance from the center axis (84). Each of the land portions (82) can be provided at substantially the same radius from a central axis (84) of the bore (72). The transition (86) from the taper (80) to the land (82) can occur in any suitable manner. In one embodiment, the transition from the taper (80) to the land (82) can form a line extending along the bore (72). The line can be substantially parallel to the central axis (84), or it can be non-parallel to the central axis (84). Moreover, the transition between the taper (80) and the land (82) may not even be a line, as it may be a non-linear transition in the direction of the central axis (84).

Each taper-land pair (78) can have an associated arc length ($\theta_{TL}$), which may or may not be the same as the arc length of a respective ramp (54)—land (56) pair. The taper-land pairs (78) can be substantially identical to each other, or at least one of the taper-land pair (78) can be different from the other taper-land pair (78) in one or more respects.

In one embodiment, the difference in radius between the beginning of the taper portion (80) and the end of the taper portion (e.g., the transition (86)) can be less than about 0.1 millimeters and, more particularly, about 0.05 millimeters.

The taper portion (80) and the land portion (82) can be provided in any suitable proportion to each other. In one embodiment, the overall arc length of each combined taper-land can be about 50% land and about 50% taper. The arc length of the taper portion can make up majority of the overall arc length of each taper-land pair (78). That is, for each taper-land pair (78), the arc length of the taper portion can be greater than the arc length of the land portion. In one embodiment, the overall arc length of each taper-land pair (78) can be about 30% land portion and about 70% taper portion. Naturally, the relative proportions of the taper portions (80) and land portions (82) can be modified as desired depending on the application at hand.

There can be any suitable quantity of taper-land pairs (78). While the embodiment shown in FIG. 5 shows five taper-land pairs (78), it will be understood that embodiments are not limited to this quantity. In some instances, a taper-land pairs (78) can be provided for each pad (74). In other instances, there may fewer taper-land pair (78) than the number of pads (74).

It should be noted that the taper-land pairs (78) may or may not be related to the configuration of a respective one of the ramp (54)—lands (56) pairs on the axially facing sides (58, 59) of the thrust bearing (52). For example, the transition (57) between the ramp (54) and the land (56) can be substantially radially aligned with the transition (86) between a respective taper-land pair (78). In other instances, the transition (57) between the ramp (54) and the land (56) can be offset from the transition (86) between a respective taper-land pair (78).

When the shaft (20) is received in the bore (72) of the thrust bearing (52), an annular clearance (90) can be defined therebetween. Because of the configuration of the taper-land pairs (78) described herein, the clearance (90) various about the central axis (84), which can be substantially co-linear with the axis of rotation of the shaft (20). Thus, it will be appreciated that the distance between the outer peripheral surface (40) of the shaft (20) and the pads (74) can be larger in the taper portion (80) compared to the land portion (82).

The inventive combination thrust bearing (52) can be constrained from rotation about its centerline (21) by a hole (75) in the thrust bearing, which fits over a pin in the bearing housing.

It should be noted that the embodiments shown in FIGS. 3-6 are with respect to a shaft rotating in the clockwise direction. However, it will be understood that embodiments are not limited to such an arrangement. Indeed, if the shaft were rotating in a counterclockwise direction, then the above-described relationships of the ramps (54), lands (56), tapers (80) and lands (81) would be the same relative to each other, but in the opposite direction. That is, in the direction of rotation, the ramps (54) and tapers (80) will precede their respective lands (56, 82).

The rotation of the shaft (20) can cause rotation of the thrust washers (62) at the same rotational speed. In the thrust area, lubricant oil, supplied via the oil canal (66) to the oil transfer galleries (68), the peripheral groove (70) and the cross cut through grooves (60), flows into the ramps (54). The rotation of the thrust washers (62), through the mechanism of viscosity of the lubricant, causes there to be an increase in hydrodynamic pressure between the rotating thrust washers (62) and the static ramps and lands (54, 56) to support the axial loads imparted by the rotating assembly against the bearing housing (23) against which the thrust bearing (52) is mounted.

Further, the rotation of the shaft (20) can cause there to be rotation of the cylinder (65) between the thrust washers (62) at the same rotational speed as that of the shaft (20). Lubricant oil, supplied via the oil canal (66) to the oil transfer galleries (68), the peripheral groove (70), and the cross cut through grooves (60), can be carried into the taper portions (80) by being dragged by the rotating shaft (20). There can be an increase in hydrodynamic pressure of the oil due to the decrease is the area between the outer peripheral surface (40) of the shaft (20) and the bore (72), going from the taper portion (80) to the land portion (82). Thus, a force is exerted by the film pressure on the shaft (20). By the time the oil reaches the land portion (82), it is at a sufficiently high pressure to ensure that the shaft (20) and the thrust bearing (52) do not touch. Further, the plurality of taper-land pair (78) can provide a plurality of relatively high pressure points between the shaft (20) and the bore (72), thereby keeping the shaft (20) centered therein.

Figure 8:
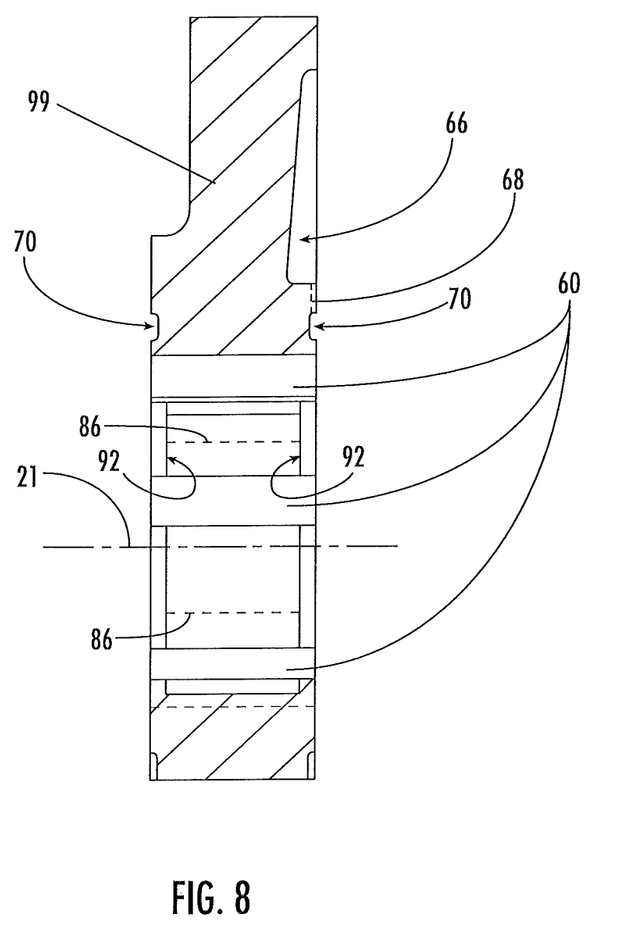
FIG. 8 is a cross-sectional view of a thrust bearing.

In one implementation, as depicted in FIG. 8, a pair of axially facing walls (92) can be supplied in the taper and the land zones, defined by the angle ($\theta_T+\theta_L$). The inner bound of the walls (92) can be the basic bore or pad diameter. The function of these walls (92) is to produce a pocket which prevents the build up of hydrodynamic pressure of the lubricating oil from axially escaping from the annulus formed by the taper portion (80), the land portion (82), and the outer peripheral surface (40) of the rotating shaft (20).

It will be appreciated that a thrust bearing (52) configured to combine the compressor-end journal bearing function within the thrust bearing while still supporting the thrust bearing function, as described herein, can provide numerous benefits. For instance, the taper-land configuration on the inner bore of the thrust bearing can achieve the function of the compressor side journal bearing, thereby potentially eliminating the need for a compressor side journal bearing. Thus, by merging the compressor side journal bearing function into the thrust bearing envelope, the axial length of the turbocharger bearing housing can be reduced by an appreciable degree.

The reduction in axial length has been estimated to be approximately 20%. The turbocharger section of FIG. 1 can provide the same aerodynamic function, with the same turbine and compressor wheels, as does the turbocharger depicted in FIG. 3, but it is estimated with about 20% less axial length between the turbine and compressor wheels (16, 18) and 15% less axial length between the shoulder (16) at the stub shaft to journal bearing diameter and the shoulder (15) at the journal bearing to weld boss diameter. This reduction in length reduces the mass of the turbocharger, which, in turn, can benefit fuel economy.

In addition, the length of the shaft (20) can be reduced, which, in turn, can create a stiffer and more stable rotor. In addition to the reduction in overall axial length of the turbocharger, the node of the moment arm of the overhung rotational inertia of the compressor wheel is moved by approximately the same amount closer to the bearing center, resulting in a much stiffer shaft, which exhibits reduced stub shaft bending and a resultant lower compressor wheel displacement, so clearances can be tighter to produce improved compressor stage efficiency.

Rotor dynamics can be improved by reducing the overhang of the compressor mass from the bearing. Further, thrust capacity can be improved due to a reduction of shaft tilt. Moreover, a reduction in the axial length of the turbocharger can be beneficial with respect to packaging the turbocharger in an engine. Finally, it may be possible to reduce the part count in a turbocharger with the elimination of the compressor side journal bearings. The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language).

Aspects described herein can be embodied in other forms and combinations without departing from the spirit or essential attributes thereof. Thus, it will of course be understood that embodiments are not limited to the specific details described herein, which are given by way of example only, and that various modifications and alterations are possible within the scope of the following claims.

The invention claimed is:

1. A turbocharger thrust bearing (52) comprising:
a main body (55) having a bore (72), the bore (72) having a center axis (84) and an associated circumferential direction about the center axis (84), the bore (72) being contoured to provide a plurality of taper-land pairs (78) distributed in the circumferential direction about the bore (72), each taper-land pair (78) including a taper portion (80) transitioning to a land portion (82), each taper portion (80) beginning at a first radial distance from the center axis (84) and extending generally in the circumferential direction therefrom to the land portion (82), the land portion (82) extending generally in the circumferential direction at a substantially constant second radial distance from the center axis (84), the second radial distance being less than the first radial distance, and wherein the main body (55) includes an array of ramps (54) and lands (56) provided about an axially facing side (58) of the main body (55).

2. The turbocharger thrust bearing of claim 1, further including a plurality of grooves (60) formed in the main body (55), wherein the grooves (60) open to the bore (72), wherein each of the plurality of taper-land pairs (78) is provided between a respective neighboring pair of grooves (60).

3. The turbocharger thrust bearing of claim 1, wherein the difference between the first radial distance and the second radial distance is from about 0.05 millimeters to about 0.1 millimeters.

4. The turbocharger thrust bearing of claim 1, wherein each taper-land pair (78) has an associated arc length ($\Theta_{TL}$), and wherein at least about 50% of the arc length ($\Theta_{TL}$) of each taper-land pair (78) is comprised of the taper portion (80).

5. The turbocharger thrust bearing of claim 4, wherein the taper portion (80) comprises at least about 70% of the arc length ($\Theta_{TL}$) of each taper-land pair (78).

6. The turbocharger thrust bearing of claim 1, wherein the plurality of taper-land pairs (80) is substantially equally spaced in the circumferential direction.

7. The turbocharger thrust bearing of claim 1, wherein the radial distance of the taper portion (80) from the center axis (84) decreases substantially continuously from the first radial distance to the second radial distance.

8. The turbocharger thrust bearing according of claim 2 further comprising an oil channel (66) and at least one oil transfer gallery (68) in fluid communication with the oil channel (66), wherein the oil channel (66) surrounds at least a portion of the main body (55), and wherein the at least one oil transfer gallery (68) is in fluid communication with the main body (55).

9. A turbocharger (50) comprising:
a bearing housing (23);
a thrust bearing (52) provided in the bearing housing (23), the thrust bearing (52) including a bore (72) with a center axis (84) and an associated circumferential direction about the center axis (84), the bore (72) being contoured to provide a plurality of taper-land pairs (78) distributed in the circumferential direction about the bore (72), each taper-land pair (78) including a taper portion (80) transitioning to a land portion (82), each taper portion (80) beginning at a first radial distance from the center axis (84) and extending generally in the circumferential direction therefrom to the land portion (82), the land portion (82) extending generally in the circumferential direction at a substantially constant second radial distance from the center axis (84), the second radial distance being less than the first radial distance; and
a shaft (20) having an associated axis of rotation (21) and having a direction of rotation about the axis (21), at least a portion of the shaft (20) being received in the bore (72), the taper-land pairs (78) being arranged such that the taper portion (80) precedes the land portion (82) in the direction of rotation, wherein the shaft (20) has a compressor region (53) and a turbine region (51), and wherein the turbine region (51) of the shaft (20) is supported by at least one journal bearing (26), and wherein the compressor region (53) of the shaft (20) is not supported by a journal bearing.

10. The turbocharger of claim 9, further including a plurality of grooves (60) formed in the main body (55), wherein the grooves (60) open to the bore (72), wherein each of the plurality of taper-land pairs (78) is provided between a respective neighboring pair of grooves (60).

11. The turbocharger of claim 9, wherein the difference between the first radial distance and the second radial distance is from about 0.05 millimeters to about 0.1 millimeters.

12. The turbocharger of claim 9, wherein each taper-land pair (78) has an associated arc length ($\Theta_{TL}$), and wherein at least about 50% of the arc length ($\Theta_{TL}$) of each taper-land pair (78) is comprised of the taper portion (80).

13. The turbocharger of claim 12, wherein the taper portion (80) comprises at least about 70% of the arc length ($\Theta_{TL}$) of each taper-land pair (78).

14. The turbocharger of claim 9, wherein the plurality of taper-land pairs (78) is substantially equally spaced in the circumferential direction.

15. The turbocharger of claim 9, wherein the radial distance of the taper portion (80) from the center axis (84) decreases substantially continuously from the first radial distance to the second radial distance.

\* \* \* \* \*